(12) United States Patent
Breu et al.

(10) Patent No.: US 11,993,158 B2
(45) Date of Patent: May 28, 2024

(54) ELECTRICAL ENERGY SYSTEM WITH FUEL CELLS

(71) Applicant: AUDI AG, Ingolstadt (DE)

(72) Inventors: Martin Breu, Rattiszell (DE); Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 267 days.

(21) Appl. No.: 17/266,532

(22) PCT Filed: Jul. 8, 2019

(86) PCT No.: PCT/EP2019/068225
§ 371 (c)(1),
(2) Date: Feb. 5, 2021

(87) PCT Pub. No.: WO2020/030357
PCT Pub. Date: Feb. 13, 2020

(65) Prior Publication Data
US 2021/0316620 A1 Oct. 14, 2021

(30) Foreign Application Priority Data
Aug. 7, 2018 (DE) ................. 10 2018 213 171.6

(51) Int. Cl.
*H02J 7/00* (2006.01)
*B60L 50/75* (2019.01)
*B60L 53/60* (2019.01)
*H02M 1/42* (2007.01)

(52) U.S. Cl.
CPC ............... *B60L 50/75* (2019.02); *B60L 53/60* (2019.02); *H02M 1/42* (2013.01); *B60L 2210/10* (2013.01)

(58) Field of Classification Search
None
See application file for complete search history.

(56) References Cited

U.S. PATENT DOCUMENTS

2004/0053082 A1* 3/2004 McCluskey ......... H01M 16/003
307/64
2010/0020579 A1* 1/2010 Melanson ............... H01F 38/02
363/89

(Continued)

FOREIGN PATENT DOCUMENTS

| DE | 10 2009 007 737 A1 | 8/2010 |
| DE | 10 2010 010 058 A1 | 9/2011 |
| DE | 10 2012 203 612 A1 | 9/2013 |

(Continued)

*Primary Examiner* — Arun C Williams
(74) *Attorney, Agent, or Firm* — Seed IP Law Group LLP

(57) ABSTRACT

An electrical energy system includes a fuel cell, a high-voltage battery, a direct-current converter with electrical isolation arranged between the fuel cell and the high-voltage battery, and a mains charging device connected between the fuel cell and the direct-current converter, wherein the mains charging device contains a rectifier but no DC-to-DC converter with electrical isolation. A method for operating such an electrical energy system for a motor vehicle includes charging the high-voltage battery by using the rectifier to rectify a mains voltage and passing the rectified mains voltage on to the high-voltage battery via the direct-current converter arranged between the fuel cell and the high-voltage battery.

3 Claims, 1 Drawing Sheet

(56) References Cited

U.S. PATENT DOCUMENTS

2010/0129690 A1    5/2010   Uemura et al.
2017/0203669 A1    7/2017   Kato et al.

FOREIGN PATENT DOCUMENTS

| DE | 10 2014 006 808 A1 | 12/2014 |
| DE | 10 2015 011 897 A1 | 4/2016 |
| DE | 10 2016 218 276 A1 | 3/2018 |
| WO | 2015/192133 A2 | 12/2015 |

\* cited by examiner

ELECTRICAL ENERGY SYSTEM WITH FUEL CELLS

BACKGROUND

Technical Field

Embodiments of the invention relate to an electrical energy system containing a fuel cell and a method for operating an electrical energy system for a motor vehicle.

Description of the Related Art

In mobile fuel cell applications, i.e., fuel cell vehicles, the energy system with the high voltage circuit (HV circuit) usually has two energy power storage systems. Customarily, the fuel cell is one of the two energy storage systems and an HV battery is the second energy storage system. Since the fuel cell has voltage that is heavily dependent on the load, it is customarily coupled with the HV battery by means of a direct current converter (DC-to-DC converter). The DC-to-DC converter rectifies the various voltages of the fuel cell and the HV battery. Since the fuel cell has a very low insulation resistance, the DC-to-DC converter is frequently designed with electric isolation. This means that the limit values for insulation resistance on the part of the HV battery, which are legally required and specified by standards, can be complied with. In order to provide the best voltage supply to the loads connected to the energy system, e.g., the drive systems of the fuel cell vehicle, these are usually supplied with power from the electrical circuit of the HV battery.

To be able to charge the HV battery, a mains charging device is conventionally used. This conventionally consists of a stage for rectification or power factor correction (or PFC for short), and a DC-to-DC converter with electrical isolation.

A motor vehicle with an HV battery is known from DE 10 2014 006 808 A1, which comprises an on-board electrical system with a connection for an external power supply, which is connected to the on-board electrical system via an electrically isolated voltage converter of the vehicle;

An energy converter device for a motor vehicle and a corresponding charging device emerges from DE 10 2009 007 737 A1. The charging device is connected to an on-board electrical system via an electrically isolated voltage converter and charges a battery.

DE 10 2016 218 276 A1 discloses a high-voltage motor vehicle electrical system comprising a control unit for distributing electrical energy originating from a charging interface and fed via the control unit to an electrically isolated DC-to-DC converter that charges a battery with a converted voltage.

The separate charging device incurs additional costs on top of those for the fuel cell system and the other components of the battery circuit. Furthermore, additional installation space is required for the charging device. In addition, the maximum charging power for the charging device strongly influences the dimensioning and thus the cost and volume of the charging device. Thus, a choice must be made between high charging power and high cost or alternatively high weight or lower charging power and lower cost or alternatively lower volume.

BRIEF SUMMARY

Embodiments described herein provide devices and methods which at least partially eliminate the disadvantages described.

Some embodiments are directed to an energy system for a vehicle. The energy system comprises at least one fuel cell; at least one HV battery; and a DC-to-DC converter with electrical isolation arranged between the at least one fuel cell and the at least one HV battery. Connected between the fuel cell and the electrical isolation DC-to-DC converter is a mains charging device that includes only a rectifier (AC-to-DC converter), but no electrical isolation DC-to-DC converter.

In one embodiment, the rectifier of the mains charging device includes a power factor correction (PFC) filter. In one embodiment, the power factor correction filter is a passive harmonic filter. In another embodiment, the power factor correction filter is an active harmonic filter. In a particular embodiment, a passive power filter is upstream of the active harmonic filter.

In one embodiment, the direct current converter with electrical isolation is a push-pull converter. In another embodiment, the direct current converter with electrical isolation is a resonant converter. In yet another embodiment, the direct current converter with electrical isolation is a bridgeless PFC converter.

In order to eliminate disadvantages caused by the charging device, the DC-to-DC converter with electrical isolation arranged between the fuel cell and the HV battery circuit is used to take over parts of the charging function. In so doing, use is, in particular, made of the fact that the DC-to-DC converter only has the task of adjusting the voltage between the fuel cell and the HV battery during driving operations. In contrast, the charging device is only used when the vehicle is stationary. The DC-to-DC converter with electrical isolation of the charging device is eliminated, reducing the complexity, cost and volume of the charging device.

Since the fuel cell power, which must be adapted by the DC-to-DC converter and passed on to the HV battery circuit, is usually significantly more than 40 kW, the DC-to-DC converter is dimensioned for corresponding powers. Higher charging powers can therefore also be achieved than with conventional mains charging devices.

Some embodiments provide a method for operating an energy system as described herein, in which, for charging the HV battery, a mains voltage is rectified via the rectifier and passed on to the HV battery with electrical isolation via the DC-to-DC converter arranged between the fuel cell and the HV battery. In one embodiment of the method, power factor correction is performed by the rectifier.

The advantages of the energy system and method described herein include low component and control costs, which enable a more cost-effective realization of the energy system than when using a conventional mains charging device. The weight and volume of the energy system are lower than conventional energy systems. In addition, the energy system enables high charging power.

Further advantages and embodiments are provided in the following description and the accompanying drawings.

It is understood that the features mentioned above and those to be explained below can be used not only in the combination indicated in each case, but also in other combinations or on their own.

DETAILED DESCRIPTION

Figure 1:
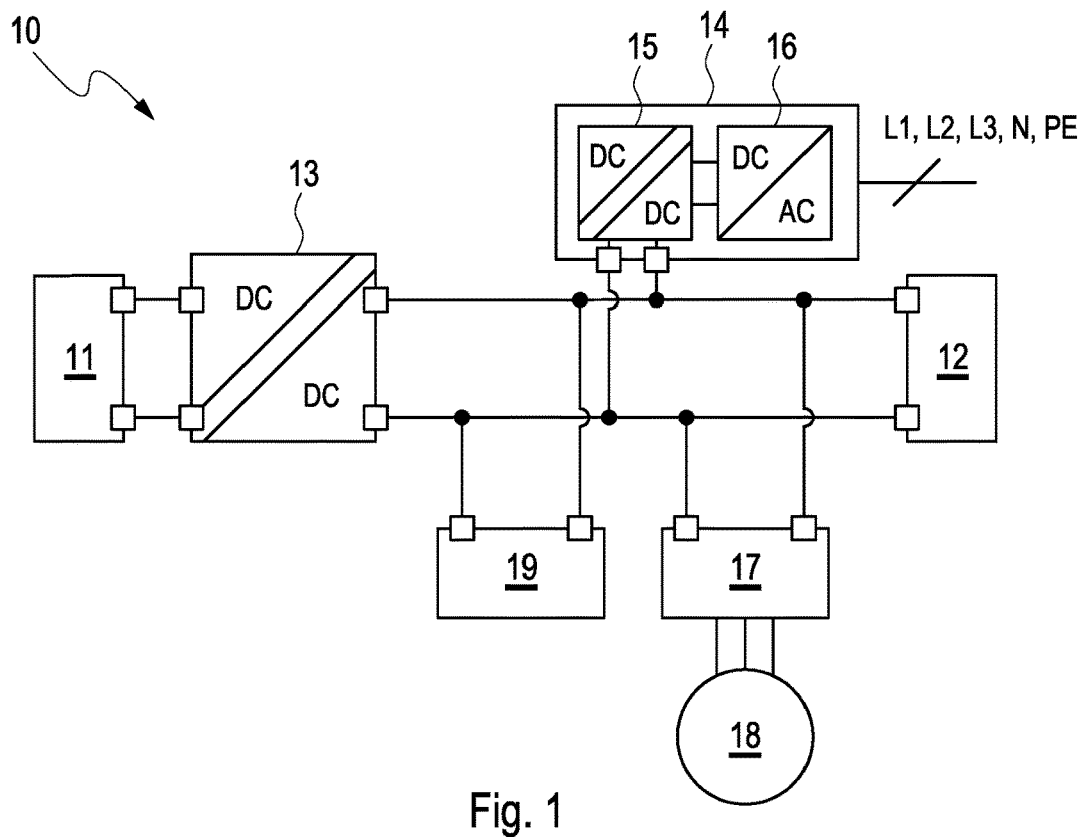
FIG. 1 shows a schematic representation of an energy system with a charging device and connected loads.

FIG. 1 shows a schematic representation of an energy system 10 with an alternating current charging device 14 and connected loads 17, 18, 19. The energy system 10 comprises a fuel cell 11 and a HV battery 12 as energy sources. These are connected via a DC-to-DC converter 13 with electrical isolation. A mains charging device 14 is connected between the DC-to-DC converter 13 and the HV battery 12. The mains charging device 14 of the energy system 10 comprises a DC-to-DC converter 15 with electrical isolation and an AC-to-DC converter 16 with power factor correction (PFC). At least one pulse inverter 17 and at least one electric motor 18 are connected to the energy system 10, as well as other HV components 19 such as auxiliary units of the fuel cell, 12 V DC-to-DC converters, HV heaters, electric air-conditioning compressors, etc.

Figure 2:
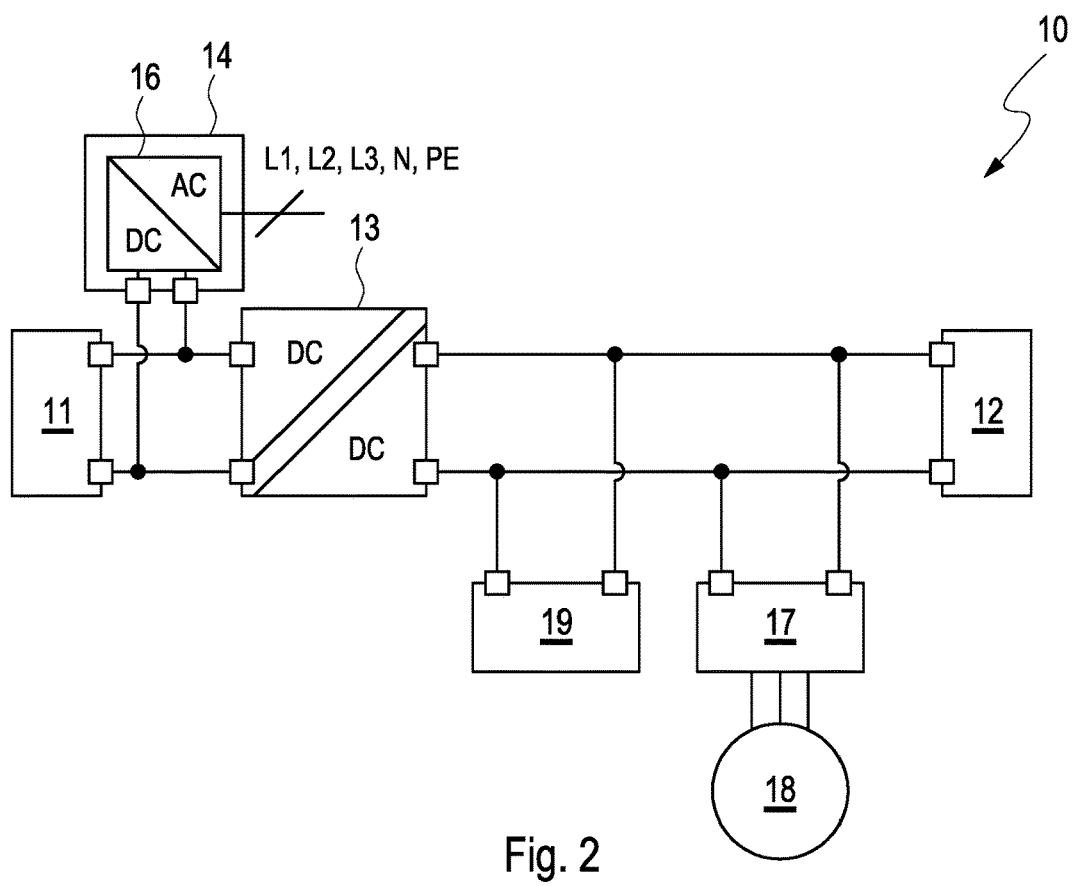
FIG. 2 shows a schematic representation of another energy system with a charging device and connected loads.

FIG. 2 shows a schematic representation of an embodiment of the energy system 10 with an alternating current charging device 14 and connected loads 17, 18, 19. The energy system 10 comprises a fuel cell 11 and an HV battery 12 as energy sources. These are connected via a DC-to-DC converter 13 with electrical isolation. A mains charging device 14 is connected between the fuel cell 11 and the DC-to-DC converter 13. The mains charging device 14 of the energy system 10 comprises only an AC-to-DC converter 16 with power factor correction (PFC). The DC-to-DC converter 13 adapts the output voltage of the mains charging device 14 to the voltage of the HV battery 12 and electrically isolates the intermediate circuit with the HV battery 12 from the mains power. In so doing, this eliminates the need for a separate DC-to-DC converter 15 with electrical isolation in the mains charging device 14. At least one pulse inverter 17 and at least one electric motor 18 are connected to the energy system 10, as well as other HV components 19 such as auxiliary units of the fuel cell, 12 V DC-to-DC converters, HV heaters, electric air-conditioning compressors, etc.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of operating an energy system for a vehicle, the energy system including a fuel cell, a high-voltage battery, a direct-current converter with electrical isolation arranged between the fuel cell and the high-voltage battery, and a mains charging device connected between the fuel cell and the direct-current converter, wherein the mains charging device contains a rectifier but no DC-to-DC converter with electrical isolation, the method comprising:
    electrically connecting the fuel cell to the direct-current converter;
    electrically connecting the high-voltage battery to the direct-current converter;
    adapting fuel cell power, by the direct-current converter, and passing adapted fuel cell power to the high-voltage battery;
    charging the high-voltage battery by using the rectifier to rectify a mains voltage and passing the rectified mains voltage on to the high-voltage battery via the direct-current converter arranged between the fuel cell and the high-voltage battery; and
    electrically isolating, by the direct-current converter, the high-voltage battery from the mains voltage.

2. The method according to claim 1, wherein a power factor correction takes place in the rectifier.

3. The method according to claim 1, wherein the direct-current converter is a push-pull converter, a resonant converter, or a bridgeless power factor correction (PFC) converter.

* * * * *